United States Patent [19]
Okada et al.

[11] 4,130,100
[45] Dec. 19, 1978

[54] DIRECT-INJECTION SPARK-IGNITION ENGINE

[75] Inventors: Shigeichi Okada, Owari-asahi; Takeshi Katoh, Nagoya, both of Japan

[73] Assignee: Mitsubishi Jukogyo Kabushiki Kaisha, Japan

[21] Appl. No.: 744,257

[22] Filed: Nov. 23, 1976

[30] Foreign Application Priority Data

Jan. 10, 1976 [JP] Japan .................................. 51-1843
Jan. 16, 1976 [JP] Japan .............................. 51-2493[U]

[51] Int. Cl.² .......................................... F02M 63/00
[52] U.S. Cl. .............................................. 123/139 BG
[58] Field of Search .................. 123/139 BG, 140 CC

[56] References Cited

U.S. PATENT DOCUMENTS

| | | | |
|---|---|---|---|
| 2,022,653 | 12/1935 | Chandler | 123/139 BG |
| 2,426,740 | 9/1947 | Mock | 123/139 BG |
| 2,902,018 | 9/1959 | Schlichtenmayer | 123/139 BG |
| 2,929,369 | 3/1960 | Staege | 123/139 BG |
| 3,620,195 | 11/1971 | Lamm | 123/139 BG |
| 3,908,624 | 9/1975 | Miyake et al. | 123/139 BG |

Primary Examiner—Charles J. Myhre
Assistant Examiner—Andrew M. Dolinar

[57] ABSTRACT

A direct-injection spark-ignition engine including a governor for sensing the rotational speed of the engine, fuel injection pumps for injecting fuel at a rate which may be increased or decreased by a fuel control rack connected to the power shaft of the governor, fuel injection nozzles for directly injecting the fuel from the pumps into the respective engine cylinders, ignition plugs for igniting and burning the fuel charges injected from the nozzles by spark discharge, and suction air passages through which air flows toward the combustion chambers, characterized by throttle valves each of which is mounted within each suction air passage to open or close the same, and throttle control mechanisms each of which is connected to the throttle valve and the fuel control rack to open or close the valve in such a way that the valve opening is increased in proportion to an increase in the quantity of fuel injection.

5 Claims, 10 Drawing Figures

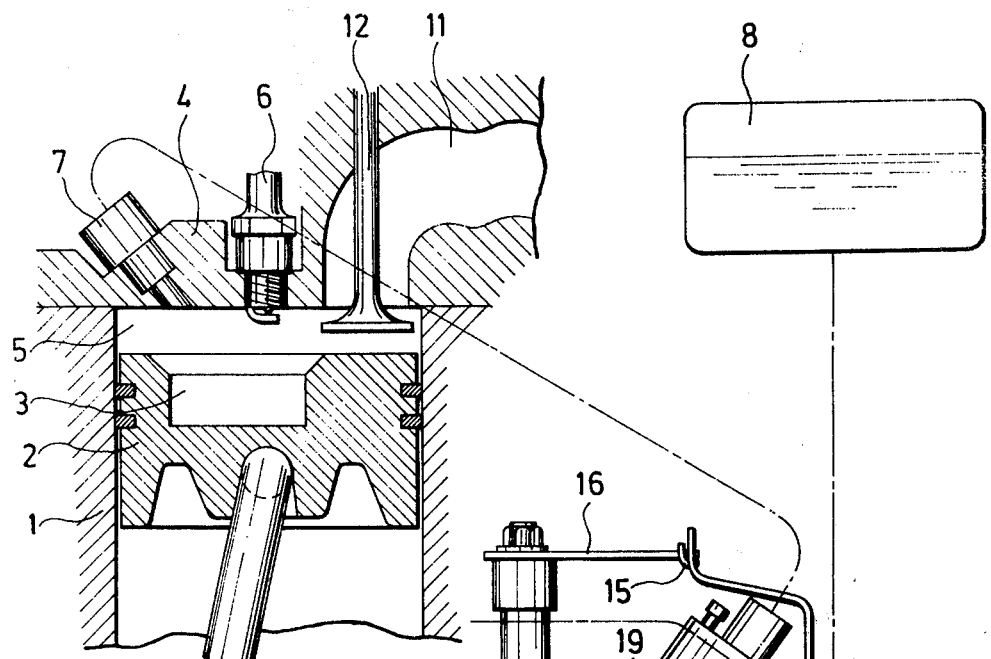
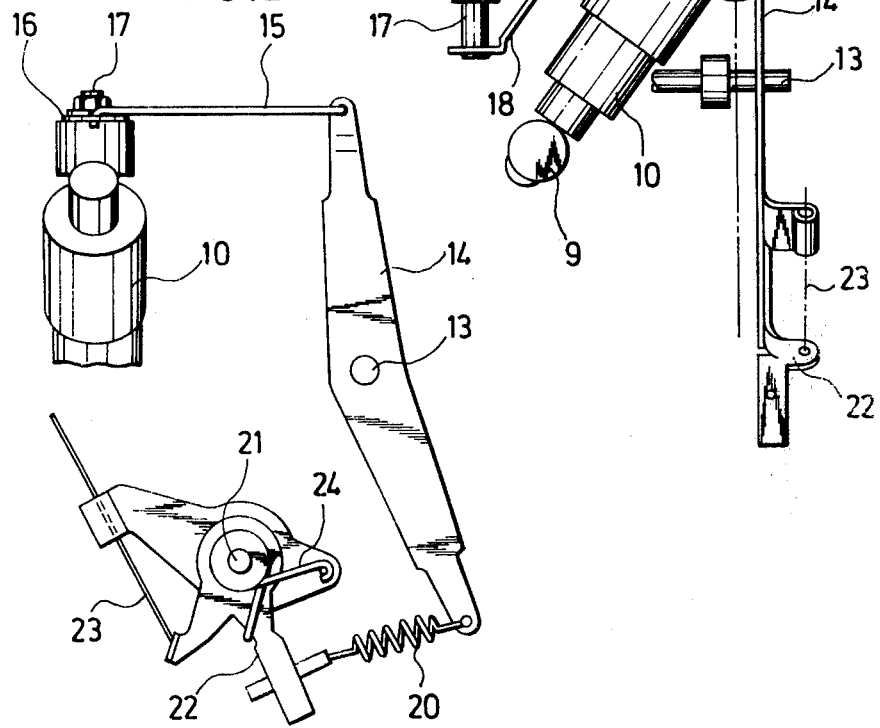

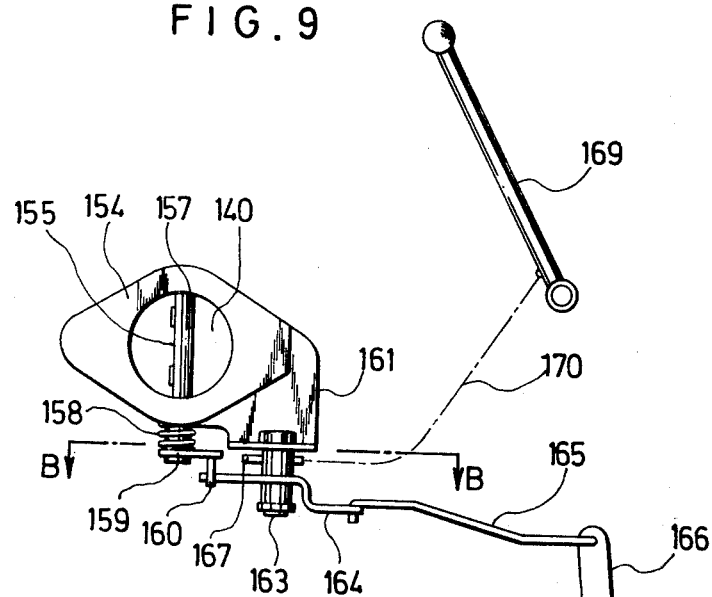
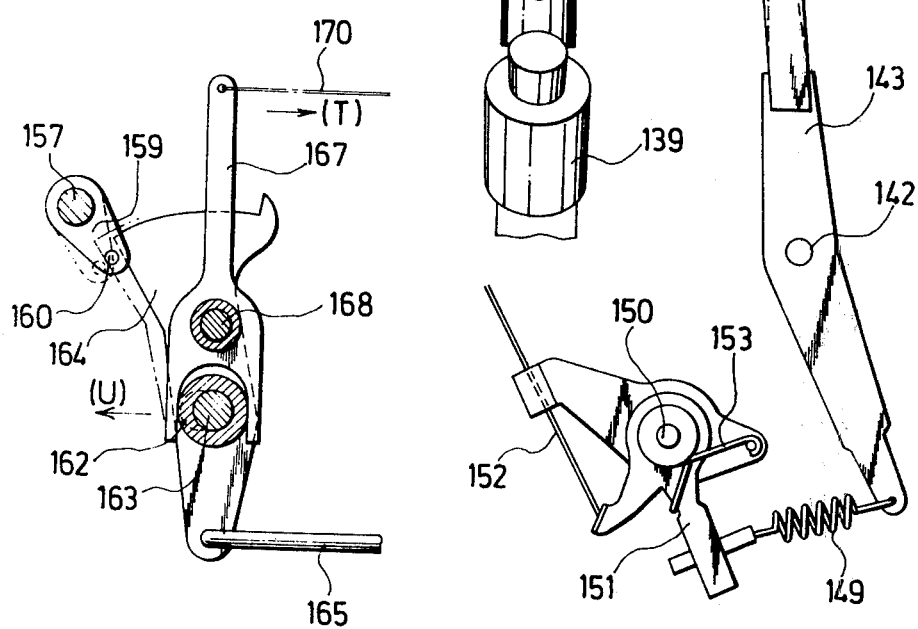

DIRECT-INJECTION SPARK-IGNITION ENGINE

This invention relates to improvements in an internal-combustion engine of the direct-injection spark-ignition type.

Existing engines of this type are as typicaly illustrated in FIGS. 1 and 2. There are shown a cylinder 1, piston 2 having a cavity 3, cylinder head 4, combustion chamber 5, ignition plug 6, and fuel injection nozzle 7 for injecting fuel from a fuel tank 8 into the combustion chamber 5 by means of a fuel injection pump 10 driven by a camshaft 9 or the like. 11 is a helically shaped inlet port, in which an inlet valve 12 is installed. Also, an exhaust port and an exhaust valve, both not shown, are provided.

Numeral 13 designates the power shaft of a conventional governor (not shown in particular), and an actuating lever 14 is secured to the power shaft 13. In the well-known manner the actuating lever 14 is operatively connected at one end to the fuel control rack of the fuel injection pump 10 through a link 15, lever 16, shaft 17, and levers 18, 19, the other end of the lever 14 being connected through a spring 20 to an operating lever 22 turnably supported by a shaft 21. The operating lever 22 is connected to operating means not shown by a cable 23. 24 is a return spring for the operating lever.

In the internal-combustion engine of the construction described, air supplied from the helical inlet port 11 during the suction stroke of the piston forms a swirling air stream in the combustion chamber 5, fuel is shot out of the fuel injection nozzle 7 at a suitable point of time into the swirl to produce a laminar, ununiform gaseous mixture therein. In a properly timed relation to this, the ignition plug 6 ignites the mixture by a spark. Combustion thus takes place and the engine begins to run. While the engine is running, the governor rotates its power shaft 13 in accordance with the throttle opening to actuate the fuel control rack of the fuel injection pump 10 through the actuating lever 14, link 15, lever 16, shaft 17, and levers 18, 19, so that fuel may be injected into the engine cylinder in adequate proportion to the load.

In the engine of the character, as above stated, the helical inlet port 11 produces a suction swirl in the combustion chamber during the suction stroke of the piston, the fuel injection nozzle 7 injects fuel at a suitable point of time into the swirling air stream to form a laminar, ununiform gaseous mixture in the combustion chamber, and in a properly timed relation to this the ignition plug 6 ignites the mixture for combustion. This enables a lean mixture to burn, reducing the proportions of unburned fuel and noxious contents, such as carbon monoxide, of the exhaust gases. The engine can run with such poorly vaporizable fuels as kerosene and light oil without the possibility of dilution.

For all the advantages including the foregoing, the prior art engine exhibits drawbacks when it uses a kerosene or light oil as fuel. As it burns such fuel at a high excess air ratio (or in a low temperature region), that is, immediately after the start and during the no-load low-speed running, it gives off irritating odor or blue smoke.

The aforementioned drawbacks of the prior art engine emanate from the fact that customarily the suction air flow is kept unthrottled even in light-load low-speed operation so as to avoid a drop of efficiency due to throttling. For the elimination of these drawbacks it is necessary to raise the exhaust temperature. One of the known approaches to this problem is to restrict the air influx into the engine cylinder. For one thing, the reduced air supply adds to the suction work of the piston, and part of the work increment is converted to heat which enhances the suction air temperature. For the other, the throttling retards combustion to such an extent that the expansion stroke of the piston is followed by combustion. Thus, the exhaust temperature can be much higher than when the air flow is not limited. This results in a smaller unburned gas discharge and less blue smoke and offensive odor.

It is an object of the present invention, with this in view, to overcome the foregoing difficulties by providing an arrangement which, in the zone of engine operation where the quantity of fuel injection is very small as immediately after the start of the engine or in the no-load low-speed zone, prevents the exhaust gases from forming blue smoke, reduces the proportion of harmful unburned fuel in the exhaust, and, particularly when kerosene, light oil or the like is used as fuel, suppresses the irritating odor in the exhaust and, further, in the zone of normal operation at loads, supplies air at a rate appropriate for the quantity of fuel injection into the cylinder to effect satisfactory combustion.

A feature of the invention to attain this end is that, in a direct-injection spark-ignition engine including a governor for sensing the rotational speed of the engine, fuel injection pumps for injecting fuel at a rate which may be increased or decreased by a fuel control rack connected to the power shaft of the governor, fuel injection nozzles for directly injecting the fuel from the pumps into the respective engine cylinders, ignition plugs for igniting and burning the fuel charges injected from the nozzles by spark discharge, and suction air passages through which air flows into the combustion chambers, there are provided throttle valves each of which is mounted within each suction air passage to open or close the same, and throttle control mechanisms each of which is connected to the throttle valve and the fuel control rack to open or close the valve in such a way that the valve opening is increased in proportion to an increase in the quantity of fuel injection.

The arrangement according to the invention permits automatic reduction in the quantity of suction air and therefore an increase in the exhaust temperature in the region of limited fuel injection as immediately after the start or when the engine is running at a low speed without load. In this way blue smoking of the exhaust gas can be prevented and the emissions of harmful substances and the irritating odor of the exhaust can be largely arrested. Also, when the engine is running at normal loads, suction air is at a rate adequate for the quantity of fuel injection, and therefore a proper excess air ratio is established and good combustion performance is maintained.

Another object of the invention is to provide an arrangement which, at the start of the engine when the quantity of fuel injection is greater than the maximum output equivalent, keeps the throttle opening maximum so as to permit the supply of enough air for starting regardless of the movement of the fuel control rack and, when the engine is in the zone below that of no-load minimum-speed running, or in the stop zone, minimizes the opening of the throttle valve irrespective of the position of the fuel control rack to facilitate the stopping of the engine.

This object is realized by a feature of the invention which resides in a throttle control mechanism adapted to connect the throttle valve operatively to the fuel control rack only when the quantity of fuel injection is within a range between the value equivalent to the maximum engine output (smokeset or simply "S.S.") and the value equivalent to the no-load minimum speed (the lowest speed at which the engine can run of itself), and also keeps the throttle valve open to a maximum when the quantity of fuel injection is more than the maximum power equivalent and keeps said valve open to a minimum when the quantity of fuel injection is less than the no-load minimum-speed equivalent.

With the foregoing mechanism the throttle valve can be kept at the maximum opening at the time of engine starting when the quantity of fuel injection exceeds the equivalent for the maximum engine output, regardless of the travel of the fuel control rack. Thus, adequate air supply is secured for the starting whereas the air throttling effect is maintained in the no-load low-speed zone, and there can be no sacrifice of the startability. Also, when the quantity of fuel injection is below the no-load minimum-speed equivalent, the throttle valve is kept open to a certain (minimum) degree independently of the movement of the fuel control rack. This permits the so-called fuel cutoff, or shifting of the fuel control rack of the fuel injection pump to the position for zero injection, to be accomplished smoothly without in the least affecting the function of the throttle valve.

Still another object of the invention is to provide an arrangement which, in the no-load low-speed zone of the engine operation, keeps the throttle valve open substantially at a minimum in cooperation with the governor and, when the clutch of the working machine equipped with the particular internal-combustion engine is "engaged", coacts with the clutch to shift the throttle valve toward the opening direction and into operative connection to the governor.

This is achieved by another feature of the invention which resides in a throttle valve mounted within the inlet port of each engine cylinder, and throttle control means for opening or closing the throttle valve in operative connection to the governor and, while the engine is running at loads, controlling the throttle valve, through means for engaging or disengaging the load with or from the engine, so that the throttle valve opening is kept greater than during the no-load running.

This makes it possible for the engine in the no-load low-speed zone or in the cold zone to increase the air throttling rate and raise the exhaust temperature thereby overcoming the aforesaid drawbacks of the existing arrangements and, for the engine in the hot zone due to running at loads, to maintain a smaller air throttling rate than during the no-load running so as to supply enough air to the engine for efficient operation.

Other objects, features, and advantages of the invention will be better understood from the following description taken in conjunction with the accompanying drawings, in which:

FIG. 1 is a partially sectional schematic view of part of an ordinary direct-injection spark-ignition engine;

FIG. 2 is a detail in side elevation of the arrangement shown in FIG. 1;

FIG. 9 is a side view of the embodiment of FIG. 8; and

FIG. 10 is a plan view as seen in the direction of the arrows B—B in FIG. 9.

Figure 3:
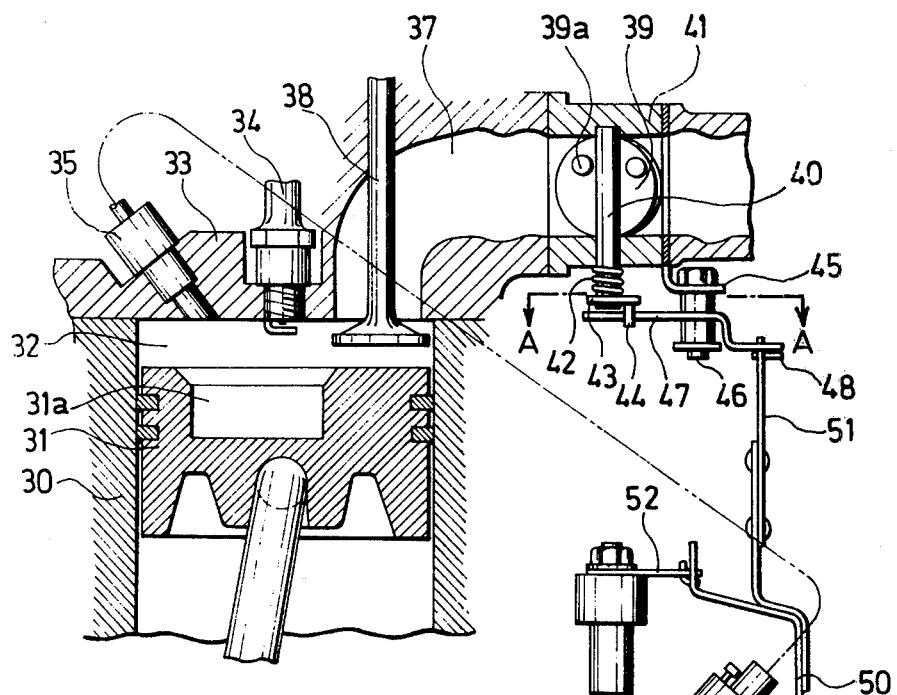
FIG. 3 is a view similar to FIG. 1 showing an embodiment of the invention.

Referring now to FIG. 3, there are shown a cylinder 30, a piston 31 having a cavity 31a forming a part of a combustion chamber 32, a cylinder head 33, and an ignition plug 34. 35 is a fuel injection nozzle which, like the prior art nozzles, injects fuel from a tank (not shown) into the combustion chamber through a fuel injection pump 36 driven by a camshaft or the like (not shown). A spiral inlet port 37 accommodates an inlet valve 38. Although not shown, there are also provided an exhaust port and an exhaust valve.

A throttle valve 39 having a few through holes 39a is installed in the inlet port 37, and its valve shaft 40 is rotatably supported by an intake cylinder 41. The valve shaft 40 is provided with a spring 42 which biases the valve 39 into a closed position. To the outer end of the shaft is secured a lever 43 having a pin 44.

To a bracket 45 fast on the intake cylinder 41 is fixed a pivot 46 which turnably supports a cam 47.

Figure 4:
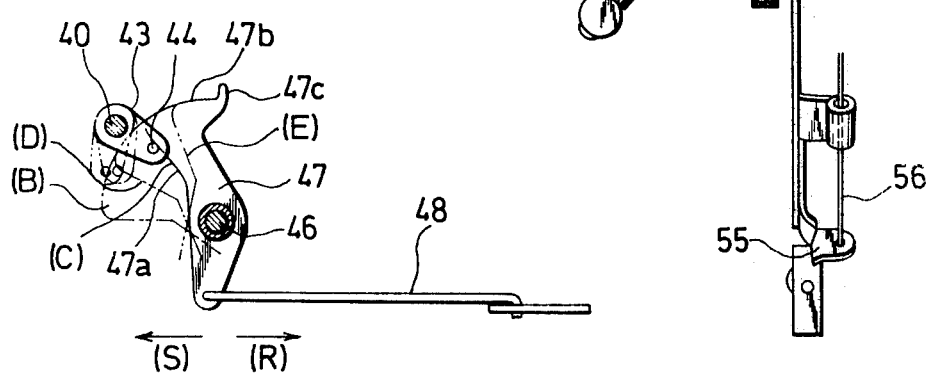
FIG. 4 is a plan view as seen in the direction of the arrows A—A in FIG. 3.

As shown better in FIG. 4, the cam 47 is turnably held at an intermediate part by the pivot 46 and is formed with a cam face at one end in engagement with the pin 44 of the lever 43 and is connected at the other end with a link 48.

The cam face of the cam 47 includes a face portion 47a in contact with the pin 44 of the lever 43 to open and close the throttle valve 39, and an arcuate face portion 47b centered in the shaft 46 to form a relief surface when the cam 47 moves from the position where the throttle valve 39 is widest open toward the direction for further opening of the valve. The arcuate surface portion 47b terminates with a stopper 47c. The link 48 is connected to a lever 51 fixedly attached to an end portion of an actuating lever 50 which, in turn, is secured to the power shaft 49 of a conventional governor (not shown).

Figure 5:
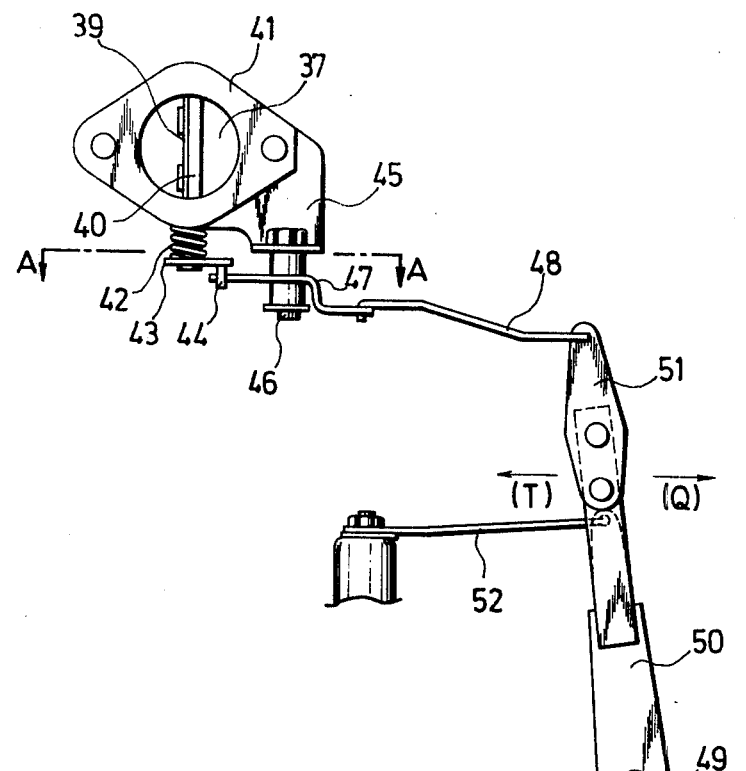
FIG. 5 is a side view of the embodiment of the invention.

In the well-known manner the actuating lever 50 is connected at one end to a link 52 operatively connected to a fuel control rack of a fuel injection pump 36. As shown in FIG. 5, the other end of the lever 50 is connected through a spring 53 to an operating lever 55 turnably supported by a shaft 54. The operating lever 55 is connected to operating means not shown by a cable 56.

The operation of the above arrangement will now be described.

During the suction stroke of the piston shown of the engine, the spiral inlet port 37 produces a swirling air stream in the combustion chamber, the fuel injection nozzle 35 injects fuel at a proper point of time into the air charge, forming a laminar, ununiform air-fuel mixture in the chamber, and then the ignition plug 34 ignites the mixture at a suitable point by a spark.

First, the starting cable 56 is pulled in the direction of the arrow (P), and the motion is transmitted through the operating lever 55 and spring 53 to the actuating lever 50, causing the lever 50 to swing about the power shaft 49 in the direction of the arrow (Q), so that the fuel control rack of the fuel injection pump 36 is urged by the link 52 toward the position where the quantity of fuel injection is increased for starting. Then, the starting button of the fuel injection pump 36 is pressed and the fuel control rack assumes the increased-injection position for starting.

At this time, the movement of the actuating lever 50 is transmitted through the lever 51 and link 48 to the cam 47, causing the cam 47 to turn about the shaft 46 in the direction of the arrow (R) to the position (B) shown in FIG. 4. Although the position (B) is located on the wider-open side of the maximum opening position of the throttle valve 39, the pin 44 of the lever 43 now bears against the cam face portion 47b, a relief portion of the cam 47, and therefore the cam 47 is allowed to turn regardless of the opening or closing of the throttle valve 39.

With the arrangement set in position as described, the engine is started by proper starting means.

As the engine starts, the governor functions (in the manner known and which need no explanation) to move the power shaft 49 and therefore the actuating lever 50 in the direction of the arrow (T) to a position for no-load low-speed running or idling.

At this point, the fuel control rack of the fuel injection pump 36 too is set to the position for no-load low-speed operation by the link 52 operatively connected to the actuating lever 50, so that a properly metered amount of fuel can be injected. The movement of the actuating lever 50 in the direction (T) is accompanied by a corresponding motion of the link 48, which forces the cam 47 in the direction of the arrow (S) to the position (C) in FIG. 4 for the no-load low-speed running. In the position (C) the throttle valve 39 is at its minimum opening and is kept in that state by the spring 42.

When the engine is immediately after the start or is idling, the inlet port 37 is kept closed by the throttle valve 39, and the engine runs with a limited air supply through the holes 39a of the valve 39.

During normal running at loads, the governor works in accordance with the throttle opening and actuates the fuel control rack of the fuel injection pump through the link 52 so that a properly metered amount of fuel is fed to meet the varying load. At the same time, the cam 47 is moved by the link 48 between the idling position (C) in FIG. 4 to the S.S. (smokeset or the maximum output equivalent) position (D), whereby the throttle valve 39 is opened or closed between the minimum and maximum opening positions to ensure the engine running with adequate air supply.

The arrangement during the engine stop with the fuel supply cut off will now be explained. When the actuating lever 50 is swung in the direction of the arrow (T) by a suitable engine-stop lever, the fuel control rack of the fuel injection pump 36 is moved by the link 52 to an injection stop position where the fuel supply is cut off and the engine is stopped. At this point, the actuating lever 50 is moved further in the direction of the arrow (T) beyond the idling position (C), and the cam 47 is moved by the link 48 in the direction of the arrow (S) past the idling position (C) to the position (E). There the cam 47 is out of engagement with the pin 44 and turns regardless of the operation of the throttle valve 39, which is now kept at a minimum opening by the action of the spring 42.

Figure 6:
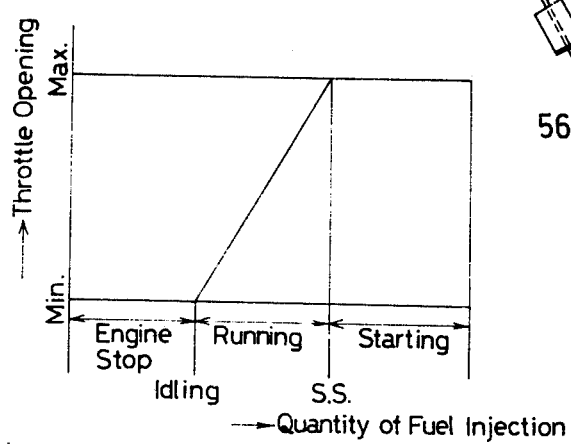
FIG. 6 is a graph illustrating the principles of the present invention.

In FIG. 6 is shown the relationship between the position of the fuel control rack of the fuel injection pump and the opening of the throttle valve as above described.

Figure 7:
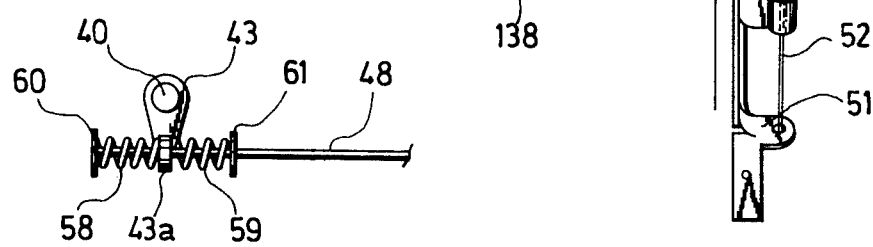
FIG. 7 is a plan view of a modification of the invention.

FIG. 7 depicts a modification of the part of the embodiment shown in FIG. 4. In this case the link 48 is extended through a flange 43a of the lever 43 fixedly mounted on the valve shaft 40 and is loaded with springs 58, 59 on the link portions, respectively, between the flange and stoppers 60, 61 fixed to the link 48. In this modification the springs 58, 59 yield to a force beyond a certain value, that is, the force exerted by the link 48 at the start of the engine or at the engine stop with cutoff of the fuel supply. Irrespective of the action of the throttle valve 39 and unyielding to the movement of the link 48 between the idling zone and the S.S. (smokeset) zone, the springs cause the lever 43 to turn the valve shaft 40, which is operatively connected to the governor, and thereby open or close the throttle valve 39. Thus, the function and effect of the modification are the same as those of the original arrangement shown in FIG. 4.

This invention presents the following advantages.

Since a throttle valve for opening and closing the suction air passage and a throttle control mechanism operatively connected to the fuel control rack to change the throttle opening in accordance with the quantity of fuel injection are provided, the quantity of suction air can be automatically decreased in the zone of limited fuel injection, such as immediately after the start of the engine or when the engine is running at a low speed without load. Consequently, the exhaust temperature is increased and blue smoking is prevented. Moreover, the noxious emissions and irritating odor of the exhaust can be reduced. At ordinary loads an adequate flow of suction air is attained in proportion to the quantity of fuel injection, and therefore a proper excess air ratio and a good combustion performance can be maintained. During the cold start when the quantity of fuel injection exceeds the value equivalent to the maximum power output of the engine, the throttle valve is kept at the maximum opening regrdless of the movement of the fuel control rack. Thus, adequate air supply is ensured at the start whereas an air throttling effect is maintained in the no-load low-speed zone, and there is no adverse effect upon the startability. Further, when the quantity of fuel injection is less than the value equivalent to the lowest speed running without load, the throttle valve maintains a predetermined (minimum) opening regardless of the position of the fuel control rack. The so-called fuel cutoff procedure, involving the shifting of the rack of the fuel injection pump to the position of zero injection, can, therefore, be accomplished smoothly without any unfavorable effect upon the throttling action.

Figure 8:
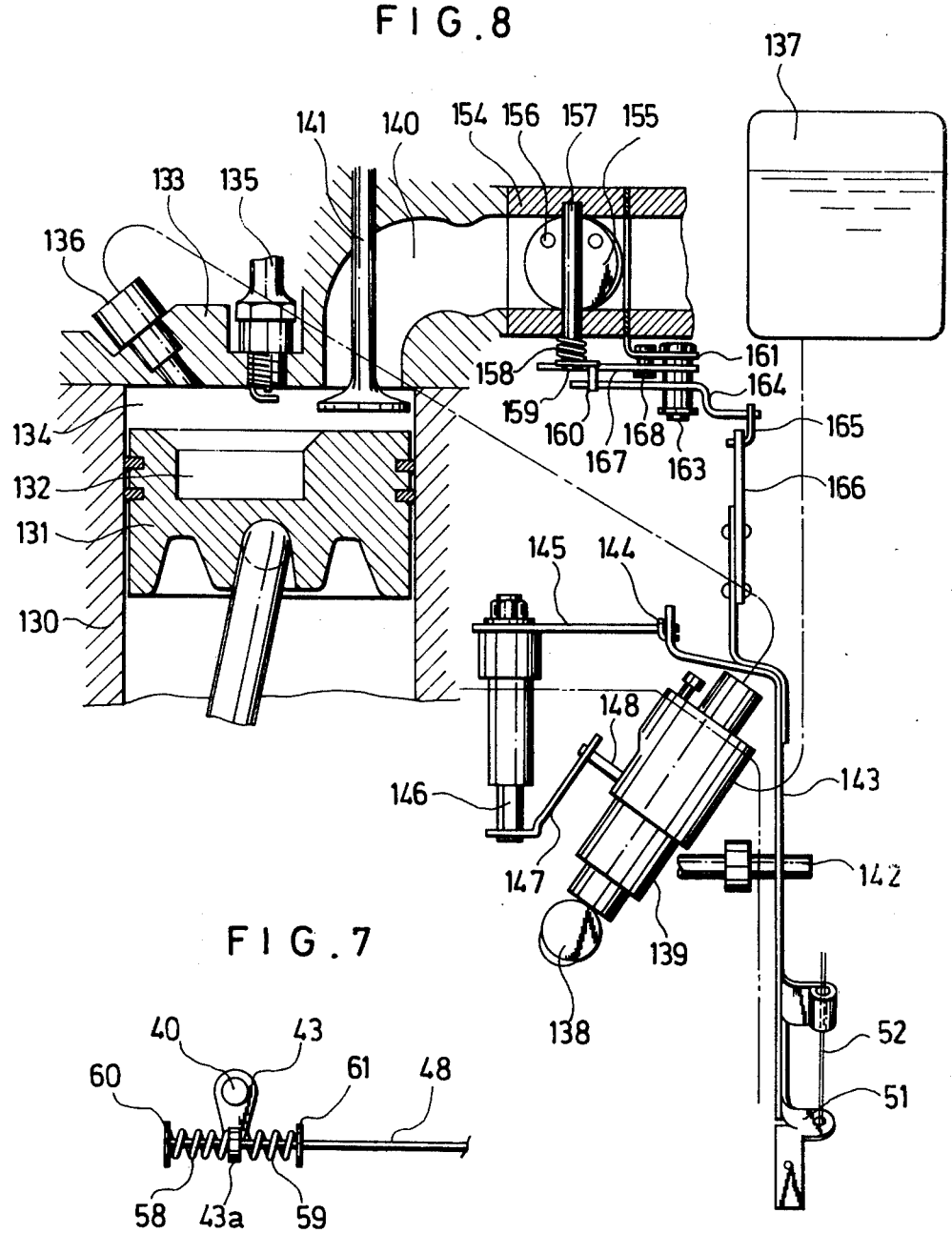
FIG. 8 is a view similar to FIG. 3, showing another embodiment of the invention.

FIGS. 8 to 10 illustrate another embodiment of the invention as comprising a cylinder 130, piston 131 having a cavity 132, cylinder head 133, combustion chamber 134, and ignition plug 135. 136 is a fuel injection nozzle for injecting fuel from a fuel tank 137 into the combustion chamber 134 through a fuel injection pump 139 driven by a camshaft 138 or the like. A helical inlet port 140 accommodates an inlet valve 141. Although not shown, there are also provided an exhaust port and an exhaust valve. 142 is the power shaft of a governor (not shown) of a known design, and an actuating lever 143 is secured to the power shaft 142. In the manner known in the art, the actuating lever 143 is operatively connected at one end to the fuel control rack of the fuel injection pump 139 through a link 144, lever 145, shaft 146, and levers 147, 148. The other end of the actuating lever 143 is connected through a spring 149 to an operating lever 151 turnably supported by a shaft 150. The operating lever 151 is connected to operating means not shown by a cable 152. 153 is a return spring for the operating lever 151. The components so far described in this paragraph are the same in configurations and functions as those of the prior art arrangements.

Numeral 154 indicates an intake cylinder forming a part of the inlet port 140, which accommodates a throttle valve 155 having holes 156 and turnably supported by a shaft 157.

One end of the shaft 157 of the throttle valve 155 extends downward through the intake cylinder 154, and the extension is loaded with a spring 158 which biases the throttle valve 155 into a closed position, and a lever 159 having a pin 160 is secured to the extension. This construction is identical with that of the preceding embodiment illustrated in FIGS. 3 and 4.

A bracket 161 is fixed to the intake cylinder 154, and it carries a pivot 163 which turnably supports a cam 164 with a slot 162 indicated by an alternate long and two short dashes line in FIG. 10.

The cam 164 is turnably held at an intermediate part by the pivot 163 and is formed with a cam face at one end in engagement with the pin 160 of the lever 159, the opposite end of the cam being connected to a link 165.

The other end of the link 165 is connected to a lever 166 attached to the actuating lever 143 of the governor.

A lever 167, which is turnably supported by the bracket 161 with a pivot 168, is bifurcated at one end in slidable engagement with the pivot of the cam 164 so that, when the lever 167 is turned about the pivot 168, the pivot 163 supporting the cam 164 can be moved along the slot 162 of the bracket 161. The other end of the lever 167 is connected by a cable 170 to clutch-operating means 169 of a working machine (not shown) that carries the engine incorporating the present invention. When the clutch is shifted to the "engaged" position, the cable 170 is pulled and the pivot 163 of the cam 164 is moved by the lever 167. The lever 167 is provided with a return spring not shown.

The throttle valve 155 is set so that it opens to a minimum degree in the no-load low-speed zone.

The operation of the embodiment with the construction just described is as follows.

During the suction stroke of the piston 131, the helical inlet port 140 produces a swirling air stream in the combustion chamber 134, the fuel injection nozzle 136 injects fuel at a proper point of time into the air charge, forming a laminar ununiform air-fuel mixture, and then the ignition plug 135 ignites the mixture at a suitable point of time.

While the engine is running, the power shaft 142 is rotated by the governor action (which is known and the description is omitted), causing the actuating lever 143 to be turned pivotally about the shaft 142, with the consequence that the fuel control rack of the fuel injection pump 139 is actuated through the link 144, lever 145, shaft 146, and levers 147, 148 to provide a suitable rate of fuel injection. At the same time, the cam 164 is actuated through the lever 166 and link 165, so that the pin 160 of the lever 159 in contact with the cam 164 is turned, whereby the opening of the throttle valve 155 is adjusted for a suitable rate of air supply to the engine. Immediately after the start or while the engine is running at a low speed without load, the throttle valve 155 is open to a minimum extent and the engine runs at a very high throttling rate, with the air supply only through the holes 156 of the valve 155. As the engine speed increases, the throttle valve 155 is gradually opened by the governor action for larger air influx in the manner already stated.

For operation at loads, the clutch lever 169 of the working machine equipped with the particular engine is shifted to have the clutch "engaged", when the cable 170 is pulled in the direction of the arrow (T) and the lever 167 is turned about the pivot 168 in the direction of the arrow (U). This causes the pivot 163 on the cam 164 to move along the slot 162 of the bracket 161 to the position indicated by the alternate long and two short dashes line in FIG. 10, where it urges the throttle valve 155 to open. From then on, the throttle opening in response to the load actuates the governor and, in the manner described above, the opening of the throttle valve 155 is controlled.

Consequently, the engine under load runs at a lower air throttling rate than during the no-load operation.

It will be appreciated from the above description of this embodiment that, when the throttle control means is connected to the load engaging-disengaging means so as to couple the engine and load together, the engaging means is shifted to the position for a greater throttle opening than during operation independent of the load, and therefore the air throttling effect in the no-load low-speed zone is maintained. When the engine is engaged with the load, that is, when the exhaust temperature can be kept sufficiently high without the necessity of throttling, the engine runs with a throttle opening always greater than during no-load operation. For this reason, enough suction air for combustion is secured without the possibility of the throttle valve inviting any shortage of air supply.

What is claimed is:

1. A direct-injection spark-ignition engine adapted to be coupled to a load including a governor having a power shaft for sensing the rotational speed of the engine, at least one fuel injection pump for injecting fuel at a rate which may be increased or decreased by a fuel control rack, a fuel control rack connected to the power shaft of said governor and operatively connected to each said fuel injection pump, fuel injection nozzles for directly injecting the fuel from said at least one pump into the respective engine cylinders, ignition plugs for igniting and burning the fuel charges injected from said nozzles by spark discharge, and suction air passages through which air is caused to flow toward the combustion chambers of said engine cylinders, throttle valves each mounted within each suction air passage to open or close the same, throttle control mechanisms each connected to each said throttle valve and to said fuel control rack to open or close said valve as a function of the quantity of fuel injected, and throttle control means for maintaining the throttle valve opening larger, when the engine is under load condition, than the throttle valve opening as determined by the fuel control rack when the engine operates under no-load condition.

2. An engine as defined in claim 1, wherein said throttle control mechanisms operatively connect said throttle valves to said fuel control rack only when the quantity of fuel injection is within a range between the valves corresponding to the maximum output and the no-load minimum speed of the engine, said throttle control mechanisms being effective to maintain said throttle valves maximally opened when the quantity of fuel injection is more than the maximum power equivalent and of maintaining said throttle valves minimally opened when the quantity of fuel injection is less than the no-load minimum speed value.

3. An engine as defined in claim 1, wherein each said throttle control mechanism comprises a cam member operatively connected to said fuel control rack a cam face of said cam member being shiftable in correspondence with the displacement of said rack, a cam follower member connected to said throttle valve and movable therewith and adapted to contact and follow the contour of said cam face of said cam member throughout a predetermined portion of the camming surface thereof so as to be cooperable therewith to control the opening and closing of said throttle valve under the influence of the movement of said fuel control rack.

4. An engine as defined in claim 1, wherein each said throttle control mechanism comprises a cam member operatively connected to said fuel control rack, a cam face of said cam member being shiftable in correspondence with the displacement of said rack, said throttle control means including a load engaging disengaging mechanism for the engine and a cam drive member operatively connectable to said cam member for selectively coupling said cam member to the load engaging-disengaging mechanism, a cam follower member connected to said throttle valve and movable therewith and adapted to contact and follow the contour of said cam face of said cam member throughout a predetermined portion of the camming surface thereof so as to be cooperable therewith to control the opening and closing of said throttle valve under the influence of the movement of said fuel control rack, said cam drive member being operatively connected to the load engaging-disengaging mechanism and adapted to shift said cam member to thereby increase the opening of said throttle valve when the engine and load are coupled.

5. An engine as defined in claim 4, including a bracket having a slot therein, said cam member being supported pivotably by means of a pivot rotatable and slidable within said slot, and said cam drive member comprising a lever pivotably mounted on said bracket having one end thereof bifurcated so as to slidably receive the pivot of said cam member therein, said lever being thus operative to selectively shift said cam member by movement of the pivot thereof within said slot.

* * * * *